United States Patent
Krishnaswamy (10) Patent No.: US 11,472,336 B2
(45) Date of Patent: Oct. 18, 2022

(54) ELECTRONICALLY OPERATED FORWARD AND REVERSE WARNING / SOUND SIGNALLING DEVICE

(71) Applicant: Ramasamy Krishnaswamy, Coimbatore (IN)

(72) Inventor: Ramasamy Krishnaswamy, Coimbatore (IN)

(73) Assignee: Ramasamy Krishnaswamy, Coimbatore (IN)

( * ) Notice: Subject to any disclaimer, the term of this patent is extended or adjusted under 35 U.S.C. 154(b) by 71 days.

(21) Appl. No.: 17/011,312

(22) Filed: Sep. 3, 2020

(65) Prior Publication Data

US 2021/0061170 A1    Mar. 4, 2021

(51) Int. Cl.
| | |
|---|---|
| *B60Q 5/00* | (2006.01) |
| *B60Q 9/00* | (2006.01) |
| *B60R 25/10* | (2013.01) |
| *B60R 25/104* | (2013.01) |

(52) U.S. Cl.
CPC .............. *B60Q 5/006* (2013.01); *B60Q 9/00* (2013.01); *B60R 25/1004* (2013.01); *B60R 25/104* (2013.01); *B60R 2025/1013* (2013.01)

(58) Field of Classification Search
CPC ...... B60Q 5/006; B60Q 9/00; B60R 25/1004; B60R 25/104; B60R 2025/1013
See application file for complete search history.

(56) References Cited

U.S. PATENT DOCUMENTS

| | | | | |
|---|---|---|---|---|
| 2006/0032957 | A1* | 2/2006 | Kolbet | B02C 21/026 241/101.74 |
| 2014/0109182 | A1* | 4/2014 | Smith | H04L 63/1416 726/3 |
| 2017/0232930 | A1* | 8/2017 | Murar | G07C 9/00309 340/5.61 |
| 2018/0053390 | A1* | 2/2018 | Morris | B60N 2/002 |
| 2019/0256044 | A1* | 8/2019 | Rude | B60R 25/102 |
| 2020/0361374 | A1* | 11/2020 | Hegarty | B66F 9/24 |
| 2021/0138959 | A1* | 5/2021 | Soni | B60Q 5/006 |

FOREIGN PATENT DOCUMENTS

CN    109981956 A  *  7/2019

* cited by examiner

*Primary Examiner* — Omer S Khan
(74) *Attorney, Agent, or Firm* — Convergence Intellectual Property Law P.C; Jonathan Garfinkel (57) ABSTRACT

The invention discloses an electronic sound signaling system that generates warning sounds in the forward and reverse mode of operation of a vehicle. The signaling system incorporates an electronic circuit with a standard automotive horn or alarm device in place of mechanical contacts or circuit breakers. The electronic circuitry includes electronically powered programmable microcontroller, a horn driver circuit, voltage sensing circuit, on a printed circuit board (PCB) Assembly and one or more sensors. The sound signaling system uses the standard automotive horn device to generate warning sounds in response to one or more sensor signals. The system also performs multiple functions and is compatible to operate in different voltage ranges. The system has many advantages, including increased reliability, increased operating voltage range, reduced circuit complexity, reduced cost and reduced ambient noise.

15 Claims, 7 Drawing Sheets

ELECTRONICALLY OPERATED FORWARD AND REVERSE WARNING / SOUND SIGNALLING DEVICE

CROSS-REFERENCE TO RELATED APPLICATIONS

This application claims priority to Indian provisional patent application No. 201941035471 entitled "ELECTRONICALLY OPERATED FORWARD WARNING/ SOUND SIGNALLING DEVICE" filed on Sep. 3, 2019 and Indian provisional patent application no. 201941035842 entitled "ELECTRONICALLY OPERATED REVERSE WARNING/SOUND SIGNALLING DEVICE" filed on Sep. 5, 2019, the full disclosures of which are incorporated herein by reference.

FIELD OF THE INVENTION

The invention generally relates to sound signaling devices and in particular to devices and methods of producing sound during forward and reverse operations in an automotive or non-automotive vehicle thereof.

DESCRIPTION OF THE RELATED ART

Horn or alarm devices are used in automobiles to warn the approach of a vehicle, or pedestrians or to alert to some hazard. The horns commonly used on automotive vehicles generate sound by vibration of a diaphragm driven by an electromagnet. The horns have mechanical contacts or circuit breakers. The life of a horn is often limited by the life of the switching contacts. The switching contacts of the mechanical horns are being replaced with electronically controlled solid-state switches. With the advent of the sensors and the usage of the sensors in sensing various parameters associated with vehicles a number of sounds are generated with speakers, buzzers, horns, etc. to warn the user of an event. The sound produced are continuous or intermittent sound, may be with or without continuous or flashing lights. The alarm uses a speaker to generate sound. An electronic circuit is used to convert the input voltage into an oscillating signal that drives the speaker diaphragm. The plurality of sound generating equipment used in the vehicle circuitry complicates the system, increases power consumption and increases the cost.

The patent application US20180152162A1 discloses a microcontroller operated electronic Backup Alarm Device for use in vehicles. U.S. Pat. No. 6,271,746B1 an US patent describes methods and devices for controlling the use of an automotive horn as a function of the speed, motion, vibration or acceleration of the automotive vehicle. The European patent application EP0655980A4 discloses a vehicle horn system that provides a plurality of different sounds, each indicative of the occurrence of a different event. The horn system includes a vehicle horn, a horn switch, and a control circuit having a plurality of inputs, one of which is coupled to the horn switch. Activation of the horn switch causes the control circuit to operate the horn to produce a standard horn sound signal. Other events for which the horn system produces an audible alert include backing-up of the vehicle and changes in the vehicle alarm status. The horn system can include a vehicle alarm sensor and a second vehicle horn that produces a different sound than the first horn. The control circuit is configured to operate only one of the horns when the vehicle is travelling below a certain speed and to operate both horns when the vehicle is travelling above that speed. CN102774319A, a Chinese patent relates to a variable tone horn system, and especially provides a horn system for a vehicle, including a piezoelectric device, a loudspeaker, and a controller.

Signaling system and method are disclosed that may be attached to an electronic control unit (ECU) of a vehicle to produce various sound signals in an automatic horn device.

SUMMARY OF THE INVENTION

In various embodiments, a signaling system for a vehicle is disclosed. The system includes an electronic circuitry configured to interface with an electronic control unit (ECU) of the vehicle. The system has one or more sensor modules that includes a horn trigger module, a wireless module, and a motion sensor module that have sensors configured to sense real time signals. The electronic circuitry also has a controller configured to receive signals from the ECU and each of the sensor modules indicative of events and generate one or more event-based signals corresponding to the received signals. The system also has an automotive horn device configured to receive the one or more event-based signals from the controller and generate one or more sound signals associated with the one or more events.

In various embodiments, the system operates in the forward and the reverse mode of operation of the vehicle and to generate a sound signal identifying reverse movement of the vehicle. In various embodiments, the operating voltage range is 9V -120V DC. In various embodiments the ECU module is configured to receive real-time signals from one or more sensors comprising a lock sensor, an engine temperature sensor, a coolant level sensor, a coolant temperature sensor, a brake failure detection sensor, an oil level detection sensor, battery charge level detection sensor, a parking brake detection sensor, a vehicle reverse gear detection sensor, an accelerometer sensor, or a fuel level detection sensor. In various embodiments the sensors are configured to detect events in real-time and the controller is configured to receive signals from the ECU indicative of the events, generate one or more event-based signals and activate the horn device to generate sounds ($S_1, S_2 \ldots S_n$) indicative of the respective events.

In one embodiment the system includes an anti-theft alarm module that includes one or more sensors selected from a motion sensor, an accelerometer, one or more visual sensors, an electromagnetic sensor or combinations thereof, configured to detect shock, noise or change in electromagnetic field that is indicative of intrusion or visual indication of intrusion. In various embodiments, the controller is configured to receive signals from the sensors and generate an intrusion event-based signal and the automotive horn or alarm device is configured to generate a sound signal characteristic of intrusion event.

In various embodiments, the system comprises an emergency detection module having one or more of a side impact sensor, a frontal crash detector, a passenger emergency switch sensor configured to detect signals that is indicative of an emergency situation and the controller is configured to receive signals from the one or more sensors and generate an emergency event-based signal and the automotive horn device is configured to generate a sound signal $S_{11}$.

In various embodiments, the system includes a child safety alert module that includes one or more motion sensor or electromagnetic sensors fixed inside the vehicle and are configured to detect motion inside the vehicle when the vehicle is in locked state. In various embodiments, the controller is configured to receive signals from the sensors and generate a safety event-based signal and the automotive horn device is configured to generate a sound signal S12.

In various embodiments, the system includes a wake-up alarm module that has a time sensor configured to measure the time duration of the air conditioner in ON state when the vehicle is stationary, an oxygen sensor configured to measure the level of oxygen inside the vehicle. In various embodiments, the controller is configured to receive signals from the time sensor or oxygen sensor or both and generate an event-based signal when either the ac ON state time is above a predetermined time or the oxygen level in the vehicle goes below a threshold value or both and the automotive horn or alarm device is configured to generate a sound signal S13.

In various embodiments, the system includes a carbon monoxide poisoning detection module that includes a time sensor configured to measure the time duration of the air conditioner in ON state when the vehicle is stationary, a carbon monoxide sensor configured to measure the level of carbon monoxide inside the vehicle and the controller is configured to receive signals from the time sensor or carbon monoxide sensor or both and generate an event-based signal when the carbon monoxide level in the vehicle goes beyond a threshold value or both and the horn device is configured to generate a sound signal S14.

In various embodiments, the system includes a wireless module that is configured to perform the functions of sending an alert signal to a user when intrusion into the vehicle is sensed, and activating or deactivating the horn device on receiving a remote control signal from the user. In various embodiments, the wireless module operates via Wi-Fi, GSM or Bluetooth signals. In various embodiments, the controller is activated through communication protocols that is selected from CAN, Custom PWM, or RS232.

In various embodiments the automotive horn device is configured to operate in a continuous operating mode or operate in an intermittent operating mode or switch to the intermittent mode from the continuous mode after a predetermined time of operating in the continuous mode or switch off from the continuous mode after a predetermined time.

In various embodiments, the sound signals are produced by controlling the fundamental frequency through controlling duty cycle of the input power. In various embodiments, the system is configured to automatically sense the operating voltage and adjust the power supply to the horn device. In various embodiments, the system is configured to drain the residual charge in an electrical system after removal of battery and the horn device is configured to generate a sound to alert the user.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments discloses electronic sound signaling systems, devices and methods that operate in the forward mode and reverse mode of operation of a vehicle. In various embodiments, the signaling system incorporates electronic circuit with a standard automotive horn device in place of mechanical contacts or circuit breakers. In various embodiments, the sound signaling system uses the standard automotive horn device to generate horning, warning and alarm sounds in response to one more sensor signals. The sound signaling system is attached to an electronic control unit (ECU) of the vehicle to receive signals from the ECU. The system also comprises various other sensors that are connected to the controller and performs multiple functions. In various embodiments, the signaling system performs multiple functions and is compatible to operate in different voltage ranges depending on the power supply in the vehicle to which the system is attached.

Figure 1:
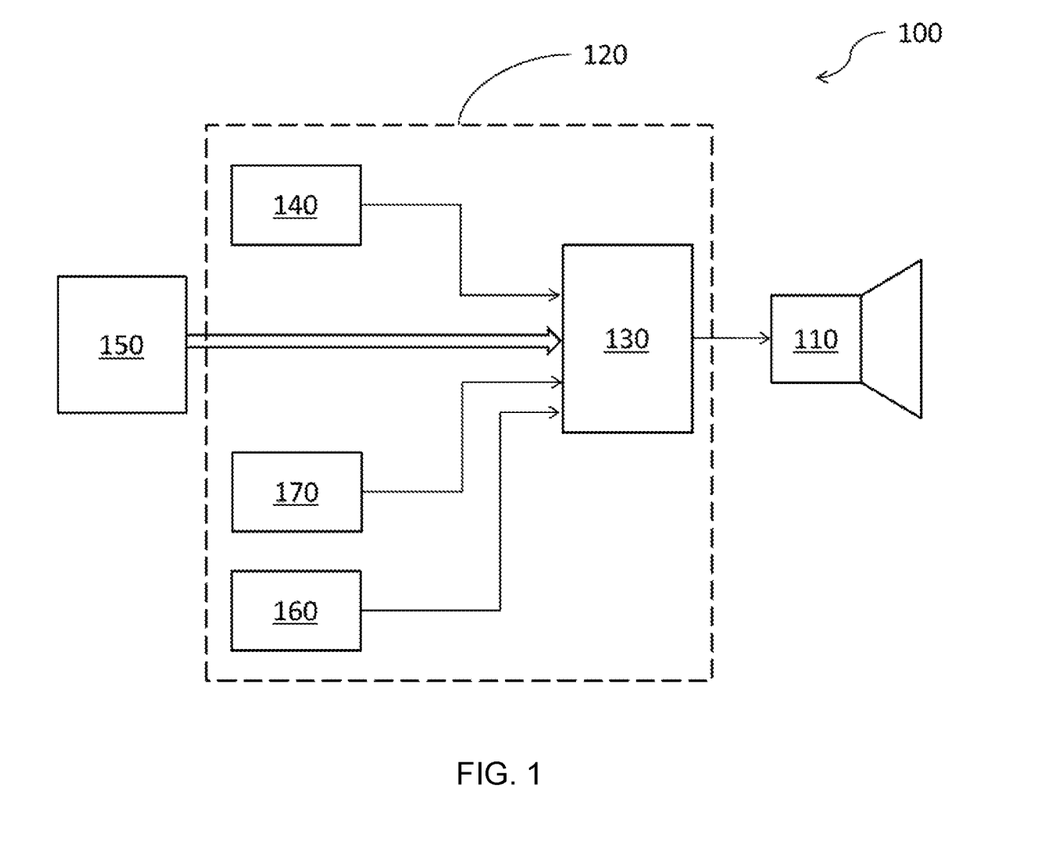
FIG. 1 illustrates the schematics of the electronics sound signaling system.

The signaling system 100, as illustrated in FIG. 1, includes an electronic circuitry 120 and an automotive horn device 110 that generates different honking sounds for a number of events that are associated with one or more modules. The electronic circuitry 120 includes one or more modules 140, 150, 160, 170 having sensors that are configured to sense real time signals and a controller 130 configured to receive inputs from the one or more modules that are indicative of events and generate one or more event-based signals corresponding to the received signals. The modules include a horn trigger module 140, the ECU 150 from the vehicle, a wireless module 160, a motion sensor module 170 and one or more modules to carry out other functions. The automotive horn device 110 is configured to receive the one or more event-based signals from the controller and generate one or more sound signals associated with the one or more events. In various embodiments the controller 130 is further configured to activate the horn device 110 through a driver circuit. In some embodiments the ECU is part of the vehicle to which the signaling system is attached to. In various embodiments, the horn device 110 may be any kind of alarm device intended to be used in a vehicle.

In various embodiments, the signaling system is compatible with electrical power supply standards of different types of vehicles that may operate at a variety of voltage levels. The signaling system may operate in 9V, 12V, 24V or 48V DC, by automatic sensing and internal adjustment of the power supply. In some embodiments the operating voltage range may increase up to 120 V DC. In various embodiments of the system, the signals from the horn trigger module 140, the ECU 150, the wireless module 160, the motion sensor module 170 and the other modules are provided as inputs to the controller 130 through signal conditioning circuits. In various embodiments, the system 100 generates unique sounds and sound levels S1, S2, S3 etc. for each event-based signal generated from the controller.

In various embodiments, the ECU module 150 is configured to receive signals from one or more sensors that sense real time signals inside or outside the vehicle or any of its components. The one or more sensors may include a locking sensor, an engine temperature sensor, a coolant level sensor, a coolant temperature sensor, a brake failure detection sensor, an oil level detection sensor, battery charge level detection sensor, a parking brake detection sensor, a vehicle reverse gear detection sensor, an accelerometer sensor, or a fuel level detection sensor. In one embodiment, the ECU 150 receives a signal from the locking module pertaining to a locked or unlocked state of the vehicle. In various embodiments the lock or unlock sensor signals are received by the ECU 150 and sent to the controller 130 to record the state of locking or unlocking. In some embodiments, the horn is activated by the controller to produce a sound to confirm successful locking or unlocking of the doors, or change of state of the lock. The sounds may or may not be unique sounds. In some embodiments, a group of alerts may share the same sound.

In another embodiment, the ECU 150 receives signal from the temperature sensor that is attached to the engine module in the vehicle. The controller 130 in various embodiments may receive signals from the temperature sensor of the engine module through the ECU 150 module to measure the engine temperature. The controller 130 produces an event-based signal if the engine temperature is above a threshold value. In various embodiments, the automotive horn device 110 is configured to produce a warning sound indicative of increased engine temperature.

In various embodiments, the ECU 150 receives signals from sensors measuring one or more of vehicle control parameters that include coolant level, brake failure detection, oil level detection and the like. In some embodiments, the ECU 150 may be integrated with the vehicle's data acquisition system to access the relevant sensor inputs. In some embodiments, the ECU 150 is configured to receive one or more sensor signal from a coolant unit. The sensors may include the coolant level sensor that measures and transmits the coolant level sensor signal to the ECU 150 and the coolant temperature sensor that measures and transmits the temperature of the coolant to the ECU 150. The controller is configured to receive signal from the ECU 150 indicative of the coolant level and coolant temperature. In one embodiment, the controller produces an event-based signal if the coolant is below a threshold value. The automotive horn device 110 is activated by the controller 130 by producing an event-based signal indicative of reduced coolant level.

In another embodiment, the controller 130 produces an event-based signal if the coolant temperature is above a threshold value. The automotive horn device 110 is activated by the controller 130 by producing an event-based signal indicative of increased coolant temperature and the horn device 110 produces a sound signal in response to increased coolant temperature level. In one embodiment, the ECU 150 may receive signals from the brake failure detection sensor that is attached to the brake pedal. The controller 130 activates the horn device 110 to produce a warning sound to the driver when a brake failure is sensed. In some embodiments, the ECU 150 receives signals from the oil level sensor in the oil level detection module and the controller 130 activates the horn device 110 to generate a warning signal when the oil level is below a threshold.

In various embodiments, the ECU 150 receives a signal when a reverse gear event is sensed by the sensor. The controller generates an event-based signal and activates the horn device to produce a signal to alert people that the car is reversing. In various embodiments when the vehicle starts from rest the ECU 150 receives signal from the sensor that detects the position of the parking brake. If the position of the brake is in locked state then the ECU 150 communicates to the controller and the controller generates an event-based signal and the horn device 110 generates a warning signal to alert the user that the parking brake is in locked state. In various embodiments, a fuel level in the vehicle is detected by a sensor attached to the fuel tank. The ECU 150 receives signals from the fuel level sensor. In various embodiments, the controller generates an event-based signal if the fuel level goes below a threshold. The horn device 110 generates a sound signal to alert the user that the fuel level is low. In various embodiments, the system is configured to drain the residual charge in the electrical system after removal of battery and the horn device is configured to generate a sound to alert the user of the event.

In various embodiments, the controller 130 is activated through one or more of various communication protocols that may include CAN, Custom PWM, RS232, etc. In some embodiments, the system may produce different types of warning sounds for different parameters. In various embodiments, the warning sounds are produced by controlling the fundamental frequency through controlling a duty cycle of the input power. In various embodiments, the system is capable of generating one or more honking sounds. The frequency of the signal is varied while the duty cycle remains the same for the different honking sounds generated. In various embodiments, the horn or alarm device 110 has multiple inputs to receive the signals for activating the different sounds configured for the events.

In various embodiments, the signaling system includes an anti-theft alarm unit. In various embodiments, an anti-theft unit receives signals from one or more sensors fitted outside and inside the vehicle. The sensors may be motion sensors, accelerometers, visual sensors, electromagnetic sensors, or the like, configured to detect shock, noise, change in electromagnetic field sensed that is indicative of intrusion or visual indication of intrusion. In various embodiments, any of the sensor inputs may be used to determine breach of perimeter of the vehicle by the controller. In various embodiments, the controller is configured to receive signals from the anti-theft unit and when a breach of perimeter of the vehicle is detected, the controller generates an event-based signal and initiates a sound signal in the horn device.

The controller may operate the horn in a continuous operation mode or an intermittent operating mode. In some embodiments when the horn is operated continuously for a longer duration in a continuous operation mode the controller may be configured to switch automatically to intermittent operation mode. In some embodiments, the switching from the continuous mode to intermittent mode may alert the driver or the user to operate the horn in limited duration to reduce the ambient noise and to reduce the irritation to the pedestrians or passers-by. In some embodiments, the sound level of the alarm may be automatically reduced when the ambient noise level is low. In some embodiments, the sound level of the alarm in the reverse mode works with respect to the ambient noise level. For e.g. the alarm sound level may be set at 5 dBA above the ambient noise level. If the ambient noise is 70 dBA, then the alarm sound output will be greater than or equal to 75 dBA. In one embodiment, the alarm device may be muted for a defined time after being ON for predetermined duration. In some embodiments the alarm operation may be cut off by another signal input. In some embodiments switching timing may be modified based on the requirements of one or more of usage, zoning regulations—hospital zone, school, courts etc., or any other parameter programmed into the controller. In one exemplary embodiment the duration of continuous tone, may be changed to 1 sec or 5 sec or 10 sec or 50 sec and so on. In another embodiment, the intermittent sound duration may be modified. In one embodiment, the horn may be muted for a defined time after being on for predetermined duration. In one embodiment, any of the settings may be preset at the factory or modified by updating the firmware.

In some embodiments, the system or the controller may function as hazard alert signal generator to bring attention of passers-by during emergencies in the vehicle. In various embodiments, the controller is configured to receive signals from one or more of a side impact sensor, a frontal crash detector, passenger safety switch or emergency switch and activate the horn device when an emergency is detected. In various embodiments, the controller may also allow the horn to be operated or deactivated through a wireless control module that operates via Wi-Fi, GSM or Bluetooth signals. In various embodiments, the wireless control module is a mobile device or a hand-held remote control device.

In some embodiments, the system and the controller may provide a child safety alert function. In some embodiments, the controller is configured to receive signals from motion sensor devices that are fixed within the vehicle to detect the presence of passengers inside locked vehicle. In some embodiments, the sensors may be motion sensors or electromagnetic sensors. The controller may initiate an alarm in the horn device when motion is sensed with the vehicle stationary and in locked condition. In some embodiments, this feature is configured to ensure child safety during accidental locking of vehicle with passengers inside. The wireless alert signals sent via Wi-Fi, GSM or Bluetooth are processed in ECU or a processor and the controller activates the horn device to trigger a sound signal based on an event.

In some embodiments, the system may operate the horn automatically for specific intervals through the feedback of air conditioner operation and through vehicle control unit, to wake-up or warn the sleeping person inside the parked vehicle, with air conditioner and engine on. In one embodiment, the warning may be based on a duration of vehicle being at rest with AC being in "ON" condition, the duration may in some embodiments be 3-8 hours. In some embodiments, the system generates a warning signal to avoid/reduces carbon monoxide poisoning to people sleeping inside the parked car. In some embodiments the carbon monoxide level may be a maximum of 10, 20, or 30 ppm before the wake-up alarm is triggered. In some embodiments, the alarm may also be triggered by a reduction in oxygen level below a minimum threshold. The minimum threshold oxygen level may be 19.5% or 20%.

Figure 2A:
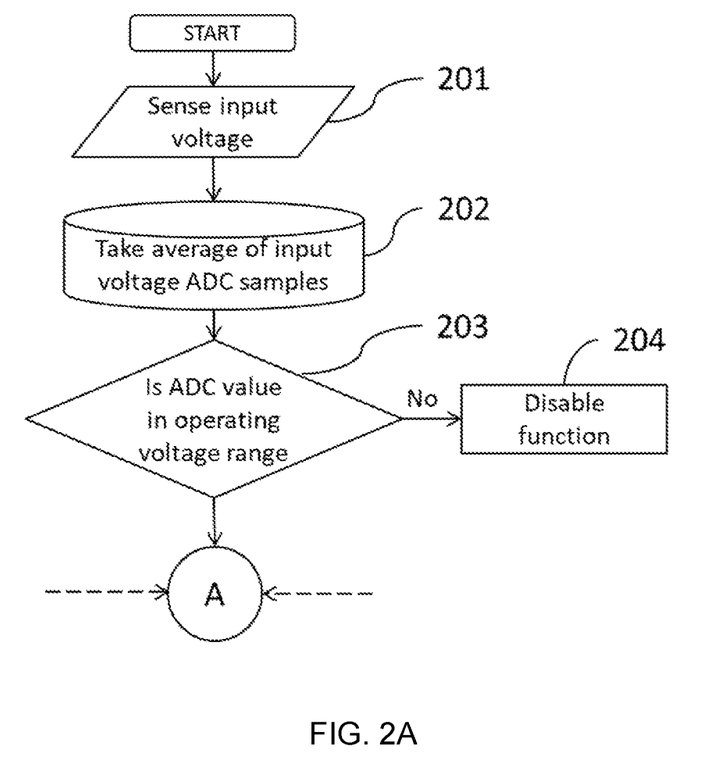
FIG. 2A shows a first part of the method of operating a horn or alarm device to obtain various functionalities.
Figure 2B:
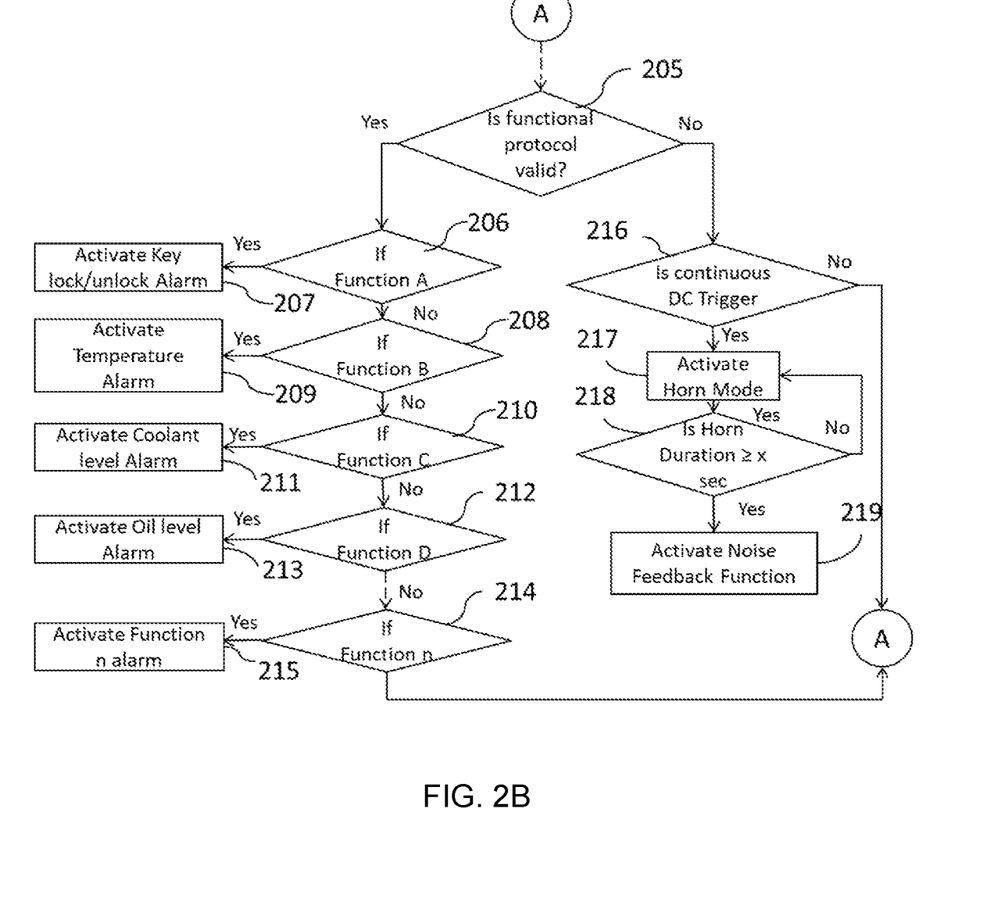
FIG. 2B shows a second part of the method of operating a horn or alarm device to obtain various functionalities.
Figure 2C:
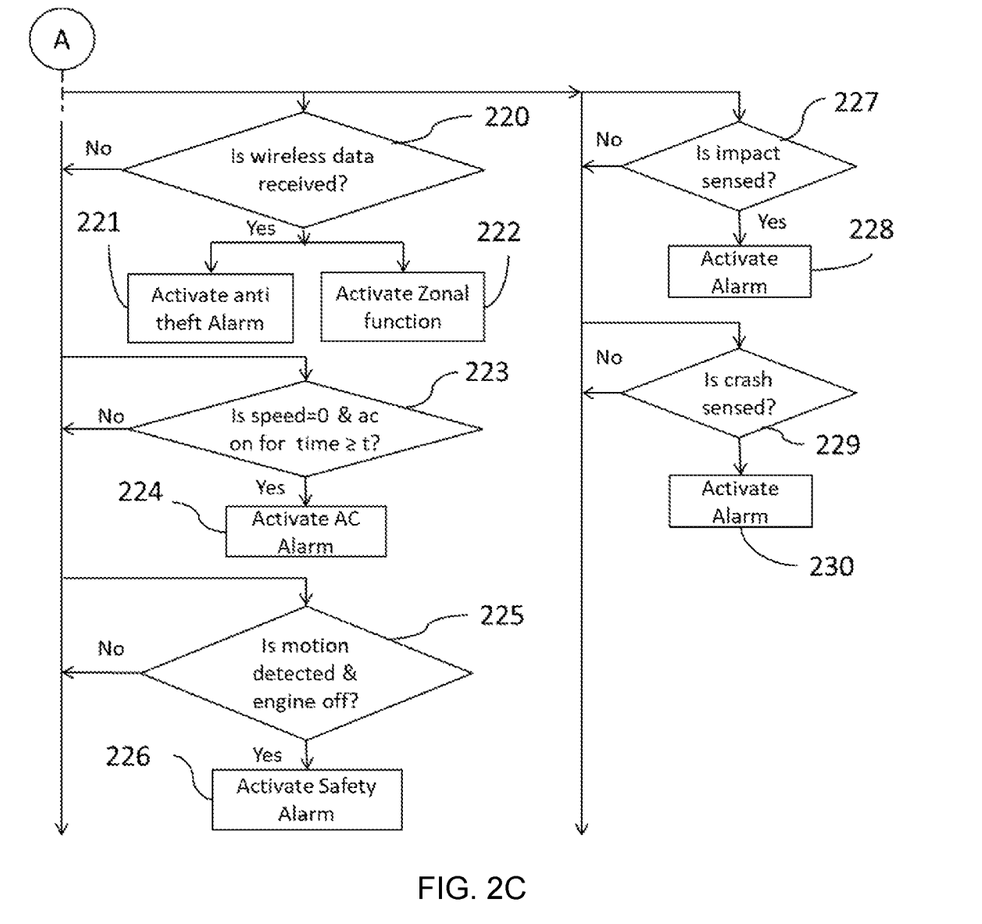
FIG. 2C shows a third part of the method of operating a horn or alarm device to obtain various functionalities.

In various embodiments, a method 200 of operating a horn device in a vehicle to obtain various functionalities is disclosed. The method as shown in FIG. 2A-2C includes receiving voltage signals in step 201 to determine if the received voltage range is in specified levels. In step 202 the average of all the voltage samples received from the ADC unit is taken and in step 203 is checked if the average value is in operating voltage range. If the voltage range is less than a threshold then the function is disabled in step 204. If the voltage range is within the operating voltage range, then in step 205 the system checks if the protocol received is valid. In step 206 the controller checks if the signal received is from the ECU for a lock or unlock state of the vehicle. In step 207 the controller activates the horn device to generate a sound signal for either the locking state or the unlocking state based on the signal sensed. In step 208 the controller checks if the signal is received from the ECU for a temperature function of the engine. If the engine temperature is above a threshold value then in step 209 the controller activates the horn device to produce a sound signal. In step 210 the controller checks if the signal is received from the ECU for a coolant level sensing from the coolant tank. If the coolant level is below a threshold value then in step 211 the controller activates the horn device to produce a sound signal to indicate the reduced level of coolant. In step 212 the controller checks if the signal is received from the ECU for an oil level sensing from the oil tank. If the oil level is below a threshold value then in step 213 the controller activates the horn device to produce a sound signal indicating the reduced level of oil.

In various embodiments, when the functional protocol in step 205 is invalid, then in step 216 the controller checks if the DC is triggered continuously. If the DC is triggered continuously, then in step 217 the controller activates the horn device to generate a sound signal. In step 218, if the sound signal lasts for a predetermined time then in step 219 the controller activates the noise feedback and the horn device may be operated in intermittent operating mode. In various embodiments, in step 220 the controlled checks if a wireless data is received. If the received signal is wireless data then the controller activates an anti-theft alarm in step 221. If the received signal is not wireless data then the controller activates one or more zonal function in step 222.

In various embodiments, the method includes a method of identifying a person sleeping in the vehicle. In step 223, the method includes receiving sensor data from the accelerometer and ac on time sensor. If the speed of the vehicle is zero and the ac is operating above a predetermined time, then the controller activates the horn device to produce an AC alarm. In step 225, the method includes identifying theft in the vehicle. The controller receives signals from the sensor that sense engine ON signals. If the engine is in OFF condition and the controller senses a movement through another sensor, then in step 226 the controller activates the horn device to generate a sound signal safety alarm. In step 227, the controller receives signals from sensors that indicate an impact in the vehicle. If an impact is sensed then in step 228, the controller activates the horn device to generate an alarm that indicate the impact event. In step 229, the method includes a crash sensing module. The controller receives signals from sensors that indicate a crash. In step 230, the controller activates the horn device to generate a sound that indicates the crash. The method may include receiving signals from various modules that are incorporated in the vehicle to which the signaling system is attached.

Figure 3:
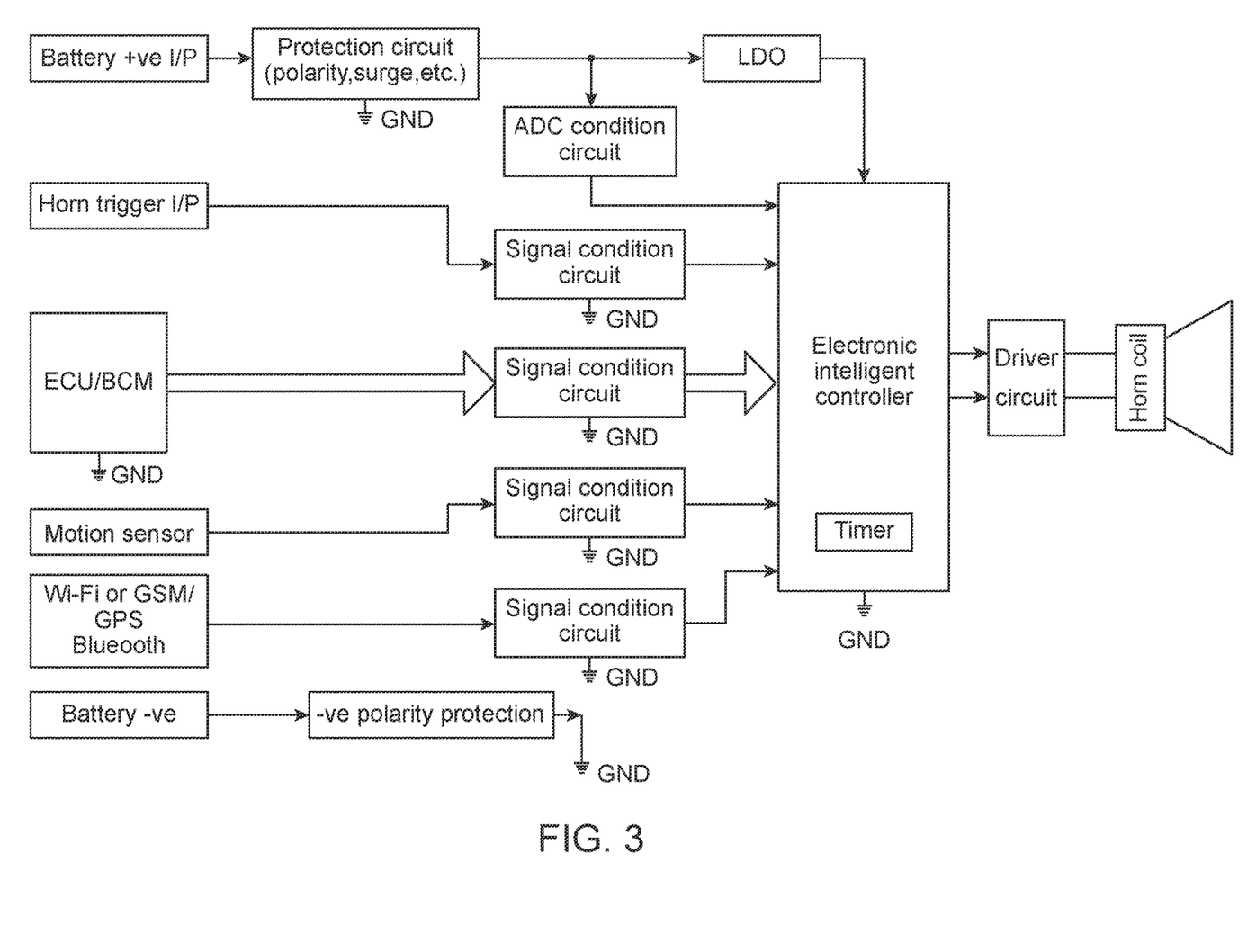
FIG. 3 illustrates a block diagram of an example implementation of the signaling system.
Figure 4A:
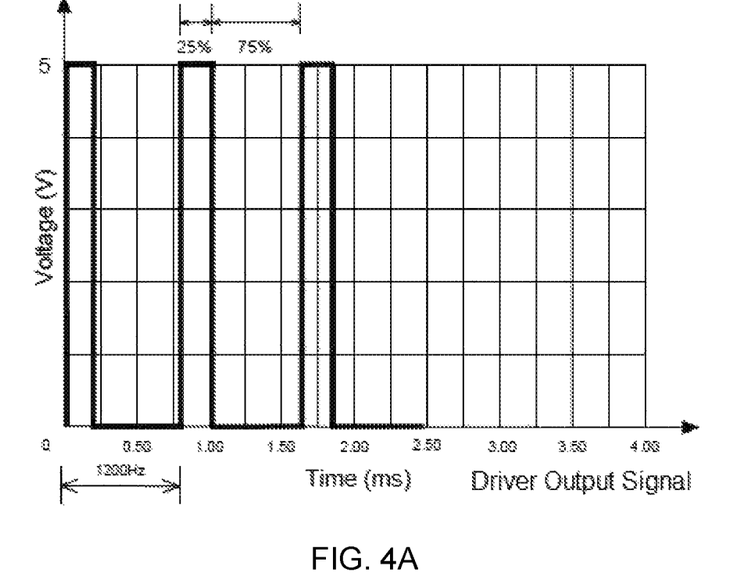
FIG. 4A illustrates a duty cycle of a sound wave having frequency of 1200 Hz.
Figure 4B:
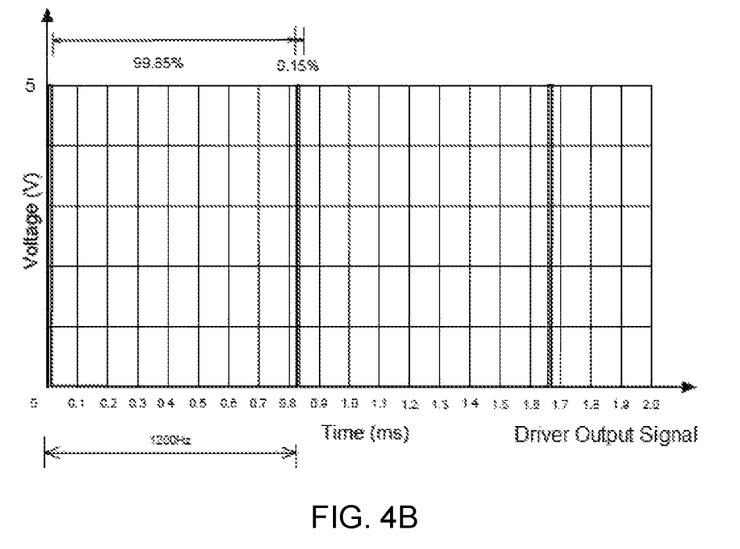
FIG. 4B illustrates a varying duty cycle of a sound wave having frequency of 1200 Hz.
Figure 4C:
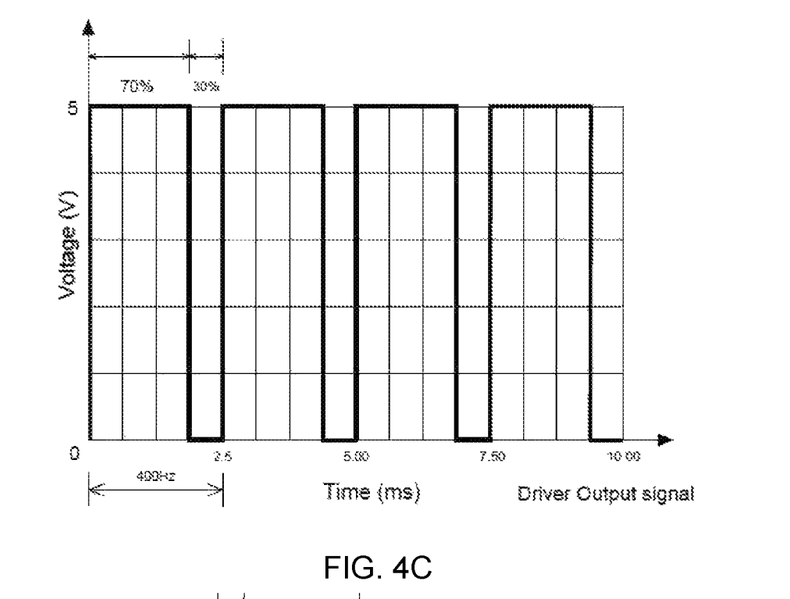
FIG. 4C shows the first duty cycle of a sound wave having frequency of 400 Hz that produces a sound.
Figure 4D:
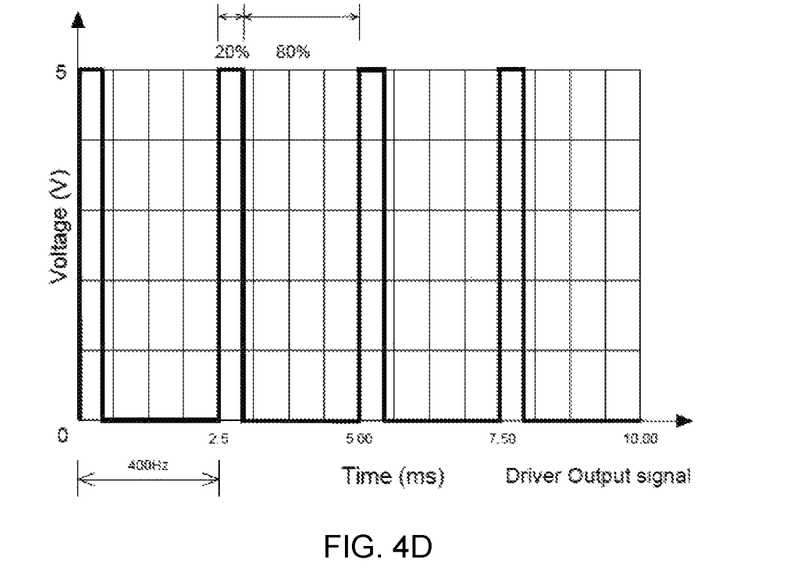
FIG. 4D shows the second duty cycle of a sound wave having frequency of 400 Hz that produces a different sound.

An example implementation of the system is shown in FIG. 3. In some embodiments the system may produce different types of warning sounds for different parameters. In various embodiments the warning sounds are produced by controlling the fundamental frequency through controlling a duty cycle of the input power as shown in FIG. 4A-FIG. 4D. In various embodiments the system is capable of generating one or more honking sounds. The frequency of the signal is varied while the duty cycle remains the same for the different honking sounds generated.

The invention has many advantages, including increased reliability, increased operating voltage range, reduced circuit complexity, reduced cost and reduced ambient noise. The signaling system disclosed performs multiple functions and is compatible to operate in different voltage ranges depending on the power supply in the vehicle to which the system is attached. Hence, additional circuitry and components are not required to be attached to the ECU or horn device thus reducing cost, complexity and power requirement.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes, and variations which will be apparent to those skilled in the art may be made in the arrangement, operation and details of the system and method of the present invention disclosed herein without departing from the spirit and scope of the invention as described here. While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope as delineated in the appended claims.

I claim:

1. A signaling system for a vehicle comprising:
   an electronic circuitry configured to interface with an electronic control unit (ECU) of the vehicle and comprising
      one or more sensor modules comprising a horn trigger module, a wireless module, and a motion sensor module having sensors configured to sense real time signals; and
      a controller configured to receive signals from the ECU and each of the sensor modules indicative of events and generate one or more event-based signals corresponding to the received signals; and
   an automotive horn device configured to receive the one or more event-based signals from the controller and generate one or more sound signals associated with the one or more events, wherein the sound signals are produced by controlling the fundamental frequency through controlling a duty cycle of the input power.

2. The system of claim 1, wherein the system is configured to sense forward and the reverse mode of operation of the vehicle and to generate a sound signal identifying reverse movement of the vehicle.

3. The system of claim 1, wherein the system is configured to have an operating voltage range of 9V-120V DC.

4. The system of claim 1, wherein the ECU module is configured to receive real-time signals from one or more sensors comprising a lock sensor, an engine temperature sensor, a coolant level sensor, a coolant temperature sensor, a brake failure detection sensor, an oil level detection sensor, battery charge level detection sensor, a parking brake detection sensor, a vehicle reverse gear detection sensor, an accelerometer sensor, or a fuel level detection sensor, wherein the sensors are configured to detect events in real-time and the controller is configured to receive signals from the ECU indicative of the events, generate one or more event-based signals and activate the horn device to generate sounds indicative of the respective events.

5. The system of claim 1, wherein the system comprises an anti-theft alarm module comprising:
   one or more sensors selected from a motion sensor, an accelerometer, one or more visual sensors, an electromagnetic sensor or combinations thereof, configured to detect shock, noise or change in electromagnetic field that is indicative of intrusion or visual indication of intrusion;
   wherein the controller is configured to receive signals from the sensors and generate an intrusion event-based signal and the automotive horn device is configured to generate a sound signal characteristic of intrusion event.

6. The system of claim 1, wherein the system comprises an emergency detection module comprising:
   one or more of a side impact sensor, a frontal crash detector, a passenger emergency switch sensor configured to detect signals that is indicative of an emergency situation;
   wherein the controller is configured to receive signals from the one or more sensors and generate an emergency event-based signal and the automotive horn device is configured to generate a sound signal.

7. The system of claim 1, wherein the system comprises child safety alert module comprising
   one or more motion sensor or electromagnetic sensors fixed inside the vehicle and are configured to detect motion inside the vehicle when the vehicle is in locked state;
   wherein the controller is configured to receive signals from the sensors and generate a safety event-based signal and the automotive horn device is configured to generate a sound signal.

8. The system of claim 1, wherein the system comprises a wake-up alarm module comprising:
   a time sensor configured to measure the time duration of the air conditioner in ON state when the vehicle is stationary; and
   an oxygen sensor configured to measure the level of oxygen inside the vehicle;
   wherein the controller is configured to receive signals from the time sensor or oxygen sensor or both and generate an event-based signal when either the ac ON state time is above a predetermined time or the oxygen level in the vehicle goes below a threshold value or both and the automotive horn device is configured to generate a sound signal.

9. The system of claim 1, wherein the system comprises a carbon monoxide poisoning detection module comprising:
   a time sensor configured to measure the time duration of the air conditioner in ON state when the vehicle is stationary; and
   a carbon monoxide sensor configured to measure the level of carbon monoxide inside the vehicle;
   wherein the controller is configured to receive signals from the time sensor or carbon monoxide sensor or both and generate an event-based signal when the carbon monoxide level in the vehicle goes beyond a threshold value or both and the horn device is configured to generate a sound signal.

10. The system of claim 1, wherein the system comprises a wireless module that is configured to perform the functions of:
sending an alert signal to a user when intrusion into the vehicle is sensed, and
activating or deactivating the horn device on receiving a remote control signal from the user.

11. The system of claim 1, wherein the wireless module operates via Wi-Fi, GSM or Bluetooth signals.

12. The system of claim 1, wherein the controller is activated through communication protocol selected from CAN, Custom PWM, or RS232.

13. The system of claim 1, wherein the automotive horn device is configurable to:
operate in a continuous operating mode,
operate in an intermittent operating mode,
switch to the intermittent mode from the continuous mode after a predetermined time of operating in the continuous mode, or
switch off from the continuous mode after a predetermined time.

14. A signaling system for a vehicle comprising:
an electronic circuitry configured to interface with an electronic control unit (ECU) of the vehicle and comprising
one or more sensor modules comprising a horn trigger module, a wireless module, and a motion sensor module having sensors configured to sense real time signals; and
a controller configured to receive signals from the ECU and each of the sensor modules indicative of events and generate one or more event-based signals corresponding to the received signals; and
an automotive horn device configured to receive the one or more event-based signals from the controller and generate one or more sound signals associated with the one or more events;
wherein the system is configured to automatically sense an operating voltage of the system and adjust the power supply to the horn device.

15. A signaling system for a vehicle comprising:
an electronic circuitry configured to interface with an electronic control unit (ECU) of the vehicle and comprising
one or more sensor modules comprising a horn trigger module, a wireless module, and a motion sensor module having sensors configured to sense real time signals; and
a controller configured to receive signals from the ECU and each of the sensor modules indicative of events and generate one or more event-based signals corresponding to the received signals; and
an automotive horn device configured to receive the one or more event-based signals from the controller and generate one or more sound signals associated with the one or more events:
wherein the system is configured to drain the residual charge in an electrical system after removal of battery and the horn device is configured to generate a sound to alert the user.

* * * * *